US010293647B2

(12) United States Patent
Hatley

(10) Patent No.: US 10,293,647 B2
(45) Date of Patent: May 21, 2019

(54) METHOD AND APPARATUS FOR ADJUSTABLE HITCH

(71) Applicant: RHINO HITCH, INC., Salt Lake City, UT (US)

(72) Inventor: Rodney Hatley, West Jordan, UT (US)

(73) Assignee: Rhino Hitch, Inc., Salt Lake City, UT (US)

( * ) Notice: Subject to any disclaimer, the term of this patent is extended or adjusted under 35 U.S.C. 154(b) by 292 days.

(21) Appl. No.: 15/135,881

(22) Filed: Apr. 22, 2016

(65) Prior Publication Data

US 2017/0305217 A1    Oct. 26, 2017

(51) Int. Cl.
*B60D 1/06* (2006.01)
*B60D 1/46* (2006.01)

(52) U.S. Cl.
CPC ...... *B60D 1/46* (2013.01); *B60D 1/06* (2013.01)

(58) Field of Classification Search
CPC ............... B60D 1/46; B60D 1/06; B60D 1/42
See application file for complete search history.

(56) References Cited

U.S. PATENT DOCUMENTS

| | | | | |
|---|---|---|---|---|
| 3,400,949 A * | 9/1968 | Kendall | ...................... | B60D 1/46 280/490.1 |
| 3,918,744 A * | 11/1975 | Gay | ...................... | B62D 53/0857 188/112 R |
| 5,934,698 A * | 8/1999 | Despain | ...................... | B60D 1/46 280/490.1 |
| 5,975,553 A * | 11/1999 | Van Vleet | ................ | B60D 1/46 280/483 |
| 6,042,137 A * | 3/2000 | McIntosh | ................ | B60D 1/07 280/462 |
| 6,155,588 A * | 12/2000 | Maxey | ................... | B60D 1/465 280/468 |
| 6,824,156 B2 * | 11/2004 | Smith | ...................... | B60D 1/52 280/490.1 |
| 6,902,181 B1 * | 6/2005 | Dye | ........................ | B60D 1/44 280/478.1 |
| 6,974,148 B2 * | 12/2005 | Moss | ....................... | B60D 1/06 280/416.1 |
| 7,219,915 B2 * | 5/2007 | Christensen | ............. | B60D 1/46 280/490.1 |
| 7,255,362 B2 * | 8/2007 | Smith | ...................... | B60D 1/46 280/462 |
| 8,276,931 B2 * | 10/2012 | DeKarske | ................ | B60D 1/06 280/507 |
| 2008/0197606 A1 * | 8/2008 | Capuano | .................. | B60D 1/02 280/477 |
| 2009/0295123 A1 * | 12/2009 | Good | ..................... | B60D 1/065 280/490.1 |

* cited by examiner

*Primary Examiner* — Joseph M Rocca
*Assistant Examiner* — Michael R Stabley
(74) *Attorney, Agent, or Firm* — David B. Tingey; Bryant J. Keller; Kirton McConkie

(57) ABSTRACT

An adjustable hitch is provided. The adjustable hitch includes a hitch body operatively coupled to a mount whereupon a hitch ball may be coupled. A coupling assembly may pivotably couple the mount to the hitch body, wherein the coupling assembly facilitates movement of the mount, and thereby the hitch ball, between a first position and a second position with respect to the hitch body. The adjustable hitch may be releasably coupled to a hitch receiver tube that is coupled to a vehicle.

20 Claims, 3 Drawing Sheets

US 10,293,647 B2

METHOD AND APPARATUS FOR ADJUSTABLE HITCH

BACKGROUND

Technical Field

The present disclosure relates to hitches, and, in particular, to an adjustable mount of a hitch.

State of the Art

A hitch may be used to provide the connection between a trailer and a tow vehicle that is to tow the trailer. However, prior to connecting any particular trailer behind any particular tow vehicle, there are circumstances to consider. Obviously, not all tow vehicles are the same, nor are all trailers. It may be desirable for a particular towing vehicle to tow one particular trailer on a trip and a different trailer on another trip. Moreover, it may be desirable to tow a particular trailer with one particular vehicle on a trip and a different vehicle on another trip.

Each of these vehicles and/or trailers may have different towing configurations. Accordingly, there is a need for an adjustable hitch to address these concerns.

SUMMARY

The present disclosure relates to hitches, and, in particular, to an adjustable ball mount of a hitch.

An aspect of the present disclosure includes an adjustable hitch comprising: a hitch body; a mount; a first coupling member coupled between the hitch body and the mount; and a second coupling member coupled between the hitch body and the mount, wherein the mount transitions between a first position and a second position with respect to the hitch body.

Another aspect of the present disclosure includes an adjustable hitch comprising: a hitch body; a mount; and a coupling assembly coupled between the hitch body and the mount, wherein the coupling assembly facilitates movement of the mount between a first position and a second position with respect to the hitch body.

Another aspect of the present disclosure includes an adjustable hitch comprising: a hitch body; a mount; a first coupling pivotably coupled at a first end to the hitch body and at a second end to the mount; a second coupling pivotably coupled at a first end to the hitch body and at a second end to the mount; a tongue extending from the mount and away from the first and second couplings, wherein a hitch ball releasably couples to the tongue, wherein the hitch ball transitions in increments along an arcuate path between first and second positions with the second position being elevated with respect to the first position.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

Figure 1:
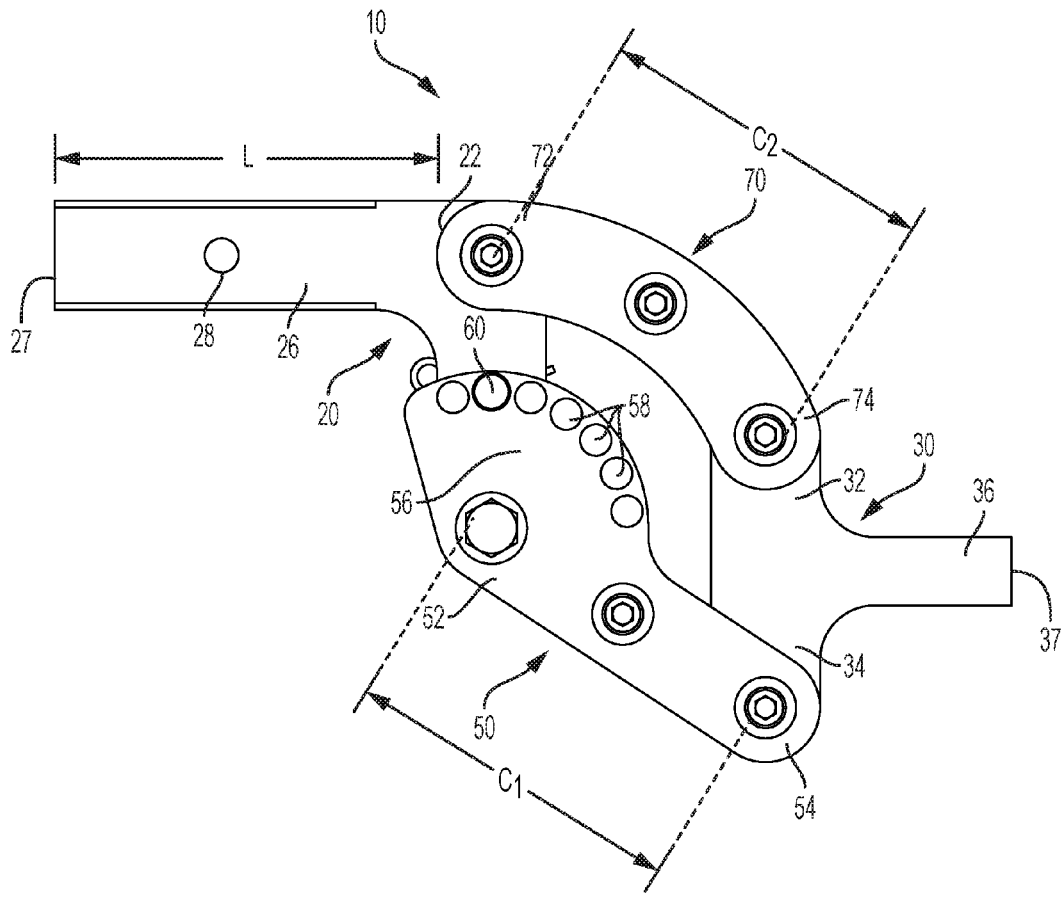
FIG. 1 is a side view of an illustrative embodiment of an adjustable hitch in accordance with the present disclosure.
Figure 2:
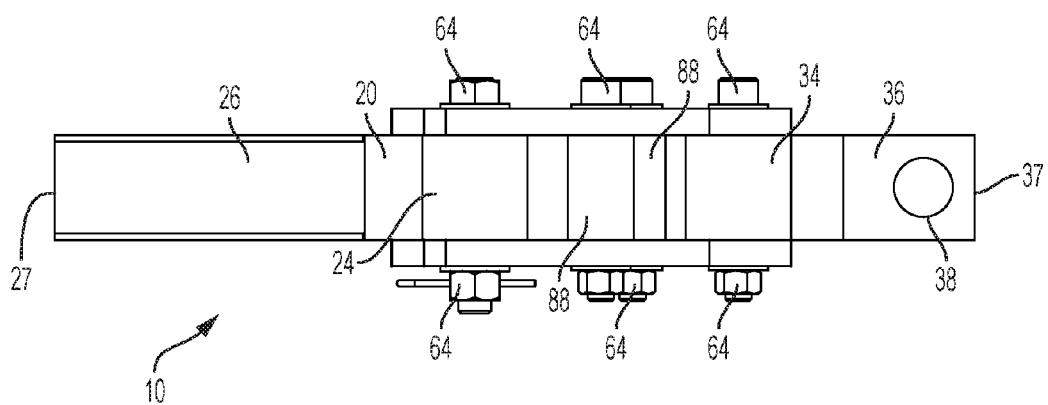
FIG. 2 is a bottom view of the illustrative embodiment of the adjustable hitch depicted in FIG. 1 in accordance with the present disclosure.

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of an adjustable hitch 10. These embodiments may each comprise various structural and functional components that complement one another to provide the unique functionality and performance of the adjustable hitch 10, the particular structure and function of which will be described in greater detail herein.

Referring to the drawings, FIGS. 1-5 depict illustrative embodiments of an adjustable hitch 10. Embodiments of the adjustable hitch 10 may comprise a hitch body 20, a mount 30, and a coupling assembly 40, among other component parts thereof.

Embodiments of the adjustable hitch 10 may comprise a hitch body 20. The hitch body 20 may be a substantially rigid member, capable of withstanding pressures and stresses exerted thereon without elastic deformation. The hitch body 20 may be comprised, for example, of metals, steels, aluminums, metal alloys, or combinations thereof, or the like that are capable of enduring the forces and pressures exerted during the towing of trailers and the like behind vehicles. The hitch body 20 may have a first end 22 and a second end 24 and a length therebetween. The body 20 may be a solid member, or may alternatively be hollow.

Embodiments of the body 20 may further comprise an anchor member 26 extending therefrom. The anchor member 26 may extend away from the body 20, such as from the first end 22, for a predetermined length L terminating at distal end 27. The anchor member 26 may also extend from the body 20 from alternative portions of the body 20, such as from the second end 24. Moreover, the anchor member 26 may extend in a substantially orthogonal arrangement with the body 20. The anchor member 26 may be a unitary piece with the body 20, but may alternatively be a separate and distinct piece from the body 20 that is thereafter coupled to the body 20. The anchor member 26 may have a cross section thereof that is square or rectangular shape. Moreover, the anchor member 26 may be hollow.

Embodiments of the adjustable hitch 10 may comprise the anchor member 26 being of a size and shape to be inserted within a hitch receiving tube or receptacle of a receiver-style hitch that is coupled to a vehicle. The anchor member 26 may be configured to be inserted within the receptacle to a distance that allows the anchor member 26 to be securely fastened to the receptacle. For example, the anchor member 26 may comprise a fastener 28, such as an opening, in the length L thereof, which may correspond to an opening, gap, or other fastening means on the receptacle that allows the anchor member 26 to be releasably fastened to the receptacle, and thereby the vehicle. The anchor member 26 may be a substantially rigid member, capable of withstanding pressures and stresses exerted thereon without elastic deformation. The anchor member 26 may be comprised, for example, of metals, steels, aluminums, metal alloys, or combinations thereof, or the like that are capable of enduring the forces and pressures exerted during the towing of trailers and the like behind vehicles. As such, the adjustable hitch 10 may be coupled to a vehicle by way of the anchor member 26 of the adjustable hitch 10 being releasably secured to the receiver-style hitch that is coupled to the vehicle.

Embodiments of the adjustable hitch 10 may comprise a mount 30. The mount 30 may be a substantially rigid member, capable of withstanding pressures and stresses exerted thereon without elastic deformation. The mount 30 may be comprised, for example, of metals, steels, aluminums, metal alloys, or combinations thereof, or the like that are capable of enduring the forces and pressures exerted during the towing of trailers and the like behind vehicles. The mount 30 may have a first end 32 and a second end 34 and a length therebetween. The mount 30 may be a solid member, or may alternatively be hollow.

Embodiments of the mount 30 may further comprise a tongue 36 extending therefrom. The tongue 36 may be a substantially rigid member, capable of withstanding pressures and stresses exerted thereon without elastic deformation. The tongue 36 may be comprised, for example, of metals, steels, aluminums, metal alloys, or combinations thereof, or the like that are capable of enduring the forces and pressures exerted during the towing of trailers and the like behind vehicles. The tongue 36 may extend away from the mount 30, such as from a midsection between the first end 32 and the second end 34, for a predetermined length terminating at distal end 37. The tongue 36 may also extend from the mount 30 from alternative portions of the mount 30, such as from the first end 32 or from the second end 34. Moreover, the tongue 36 may extend in a substantially orthogonal arrangement with the mount 30. The tongue 36 may be a unitary piece with the mount 30, such that the tongue 36 and the mount 30 may be considered a single piece, referred to solely as the mount 30. In the alternative, the tongue 36 may be a separate and distinct piece from the mount 30 that may thereafter be coupled to the mount 30. The tongue 36 may have a cross section thereof that is square or rectangular shape. Moreover, the tongue 36 may be hollow.

Embodiments of the adjustable hitch 10 may comprise the tongue 36 being of a size and shape to receive a hitch ball 80 thereon. For example, the tongue 36 may comprise a first face 33 and a second face 35, with a port 38 extending therethrough. The port 38 may be an opening, gap, hole, or other reception feature that may permit the hitch ball 80 to fasten thereby to the tongue 36. The hitch ball 80 may comprise a threaded shank that may pass through the first side 33 of the port 38, such that a threaded nut may engage the threaded shank on the second side 35 of the port 38. The threaded nut may thereafter be threaded up the shank until the hitch ball 80 is securely fastened to the tongue 36 by friction fit with the port 38. The port 38 may be configured with a diameter to receive any size of shank of a particular hitch ball 80, such that hitch balls 80 of various sizes may be coupled to the mount 30, and thereby to the adjustable hitch 10. With a hitch ball 80 securely attached to the mount 30, a trailer coupler of a trailer may physically engage the hitch ball 80 to couple the trailer to the adjustable hitch 10. With the adjustable hitch 10 also physically attached to the hitch receiver tube on a vehicle, the trailer may be coupled to the vehicle by way of the adjustable hitch 10 for the vehicle to tow, maneuver, and otherwise pull the trailer.

Embodiments of the adjustable hitch 10 may comprise the hitch ball 80 being coupled directly to the mount 30. The mount 30 may be configured to receive thereon the hitch ball 80 and support the hitch ball 80 in such a way that the hitch ball 80 is substantially orthogonal to the receptacle of the receiver-type hitch coupled to the vehicle. Moreover, embodiments of the adjustable hitch 10 may comprise the hitch body 20 being releasably coupled directly to the receptacle of the receiver-type hitch, such that the anchor member 26 of the hitch body 20 are considered a single unitary piece, referred to solely as the hitch body 20.

Embodiments of the adjustable hitch 10 may comprise a coupling assembly 40 that may permit the mount 30 to adjust relative to the hitch body 20. For example, the coupling assembly 40 may be pivotably coupled between the hitch body 20 and the mount 30, so as to permit the mount 30 to pivot, or otherwise rotate, with respect to the hitch body 20. As such, the mount 30, tongue 36, and hitch ball 80 may likewise pivot, or otherwise rotate, with respect to the hitch body 20. Such movement allows the hitch ball 80 to be placed at varied incremental elevations with respect to the hitch body 20. Further, the coupling assembly 40 may be configured to permit the hitch ball 80 to pivot, or otherwise rotate, with respect to the hitch body 20, in a non-linear path. For example, the coupling assembly 40 may be configured to permit the hitch ball 80 to pivot, or otherwise rotate, with respect to the hitch body 20, in an arcuate path. By transitioning in an arcuate path, the hitch ball 80 may not only be positioned at varied elevations with respect to the hitch body 20 but may also be positioned at varied horizontal distances from the hitch body 20. In other words, as the hitch ball 80 traverses between the varied incremental elevations, with respect to the hitch body 20, the hitch ball 80 may also traverse through varied horizontal incremental distances, with respect to the hitch body 20. The coupling assembly 40 may further be configured to permit the first face 33 of the tongue 36 to remain substantially parallel with the length L of the anchor member 26 as the mount 30 transitions between the varied vertical elevations and horizontal distances.

Embodiments of the adjustable hitch 10 may comprise the coupling assembly 40 having a first coupling 50. The first coupling 50 may be a substantially rigid member, capable of withstanding pressures and stresses exerted thereon without elastic deformation. The first coupling 50 may be comprised, for example, of metals, steels, aluminums, metal alloys, or combinations thereof, or the like that are capable of enduring the forces and pressures exerted during the towing of trailers and the like behind vehicles. The first coupling 50 may have a first end 52 and a second end 54 with a length $C_1$ therebetween. The first coupling 50 may be coupled to each of the hitch body 20 and the mount 30. The first coupling 50 may be coupled between the hitch body 20 and the mount 30. The first coupling 50 may be pivotably coupled to each of the hitch body 20 and the mount 30. The first end 52 may be coupled to the hitch body 20, such as, for example, at or near the second end 24 of the hitch body 20. The second end 54 may be coupled to the mount 30, such as, for example, at or near the second end 34 of the mount 30. The first end 52 may be coupled to the hitch body 20 by a fastener 64, and, in like manner, the second end 54 may be coupled to the mount 30 by a fastener 64. The fastener 64 may be, for example, a bolt and nut fastener or other similar fastener that permits rotational motion or pivoting action between the hitch body 20, the mount 30, and the first coupling 50. With the first coupling 50 pivotably coupled to each of the hitch body 20 and the mount 30, the first coupling 50 may facilitate movement, transition, articulation, displacement, or rotational motion to the mount 30, with respect to the hitch body 20, and vice versa.

Embodiments of the adjustable hitch 10 may comprise the coupling assembly 40 having a second coupling 70. The second coupling 70 may be a substantially rigid member, capable of withstanding pressures and stresses exerted thereon without elastic deformation. The second coupling 70 may be comprised, for example, of metals, steels, aluminums, metal alloys, or combinations thereof, or the like that are capable of enduring the forces and pressures exerted during the towing of trailers and the like behind vehicles. The second coupling 70 may have a first end 72 and a second end 74 with a length $C_2$ therebetween. The second coupling 70 may be coupled to each of the hitch body 20 and the mount 30. The second coupling 70 may be coupled between the hitch body 20 and the mount 30. The second coupling 70 may be pivotably coupled to each of the hitch body 20 and the mount 30. The first end 72 may be coupled to the hitch body 20, such as, for example, at or near the second end 24 of the hitch body 20. The second end 74 may be coupled to the mount 30, such as, for example, at or near the second end 34 of the mount 30. The first end 72 may be coupled to the hitch body 20 by a fastener 64, and, in like manner, the second end 74 may be coupled to the mount 30 by a fastener 64. The fastener 64 may be, for example, a bolt and nut fastener or other similar fastener that permits rotational motion or pivoting action between the hitch body 20, the mount 30, and the second coupling 70. With the second coupling 70 pivotably coupled to each of the hitch body 20 and the mount 30, the second coupling 70 may facilitate movement, transition, articulation, displacement, or rotational motion to the mount 30, with respect to the hitch body 20, and vice versa.

Figure 5:
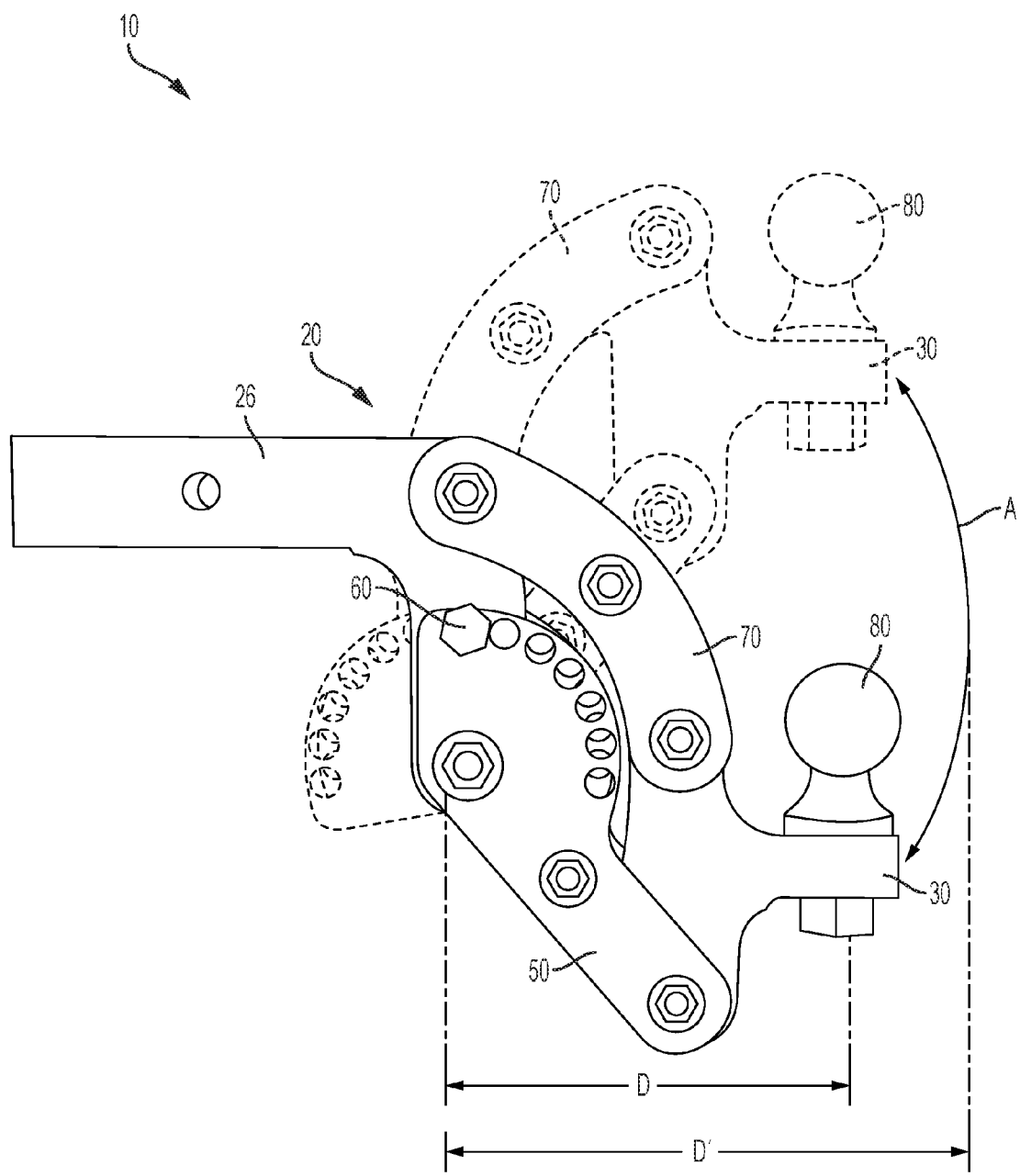
FIG. 5 is a side view of the illustrative embodiment of the adjustable hitch depicted in solid lines in a lower-most elevated position and in dashed lines in an upper-most elevated position in accordance with the present disclosure.

With reference to FIG. 5, embodiments of the adjustable hitch 10 may comprise the first coupling 50 and the second coupling 70 facilitating articulation of the mount 30 with respect to the hitch body 20, or vice versa. For example, the mount 30 may be positioned at a first position where the mount 30 is set at a lower-most elevation. By adjusting the first coupling 50 and the second coupling 70, the mount 30 may articulate, transition, or otherwise move with respect to the hitch body 20 to a second position that is different than the first position. The second position may be a position where the mount 30 is set at an upper-most elevation. The first and second positions may be defined, referenced, and/or measured with respect to one another, to a ground surface on which the vehicle rests, to the hitch body 20, or to the receiving tube of the receiver-style hitch on the vehicle.

Embodiments of the adjustable hitch 10 may comprise the coupling assembly 40 allowing the mount 30 to be set at one or more positions between the lower-most position and the upper-most position. For example, the coupling assembly 40 may be moved or adjusted until the mount 30 is at a desired position between the first and second positions. At the desired position, coupling assembly 40 may be engaged, fixed, or otherwise secured to the hitch body 20 to prevent further movement of the mount 30. Moreover, the coupling assembly 40 may be moved or adjusted to incremental positions with regard to the hitch body 20, such that the mount 30, and thereby the hitch ball 80, may correspondingly move to incremental positions between the first and second positions. The couplings assembly 40 may allow the mount 30, and thereby the hitch ball 80 coupled thereto, to move in a non-linear path between the first and second positions, inclusive. Accordingly, the mount 30 of the adjustable hitch 10 may be adjusted upward for greater vertical elevation or downward for lesser vertical elevation without having to remove the hitch 10 from the vehicle. Indeed, embodiments of the adjustable hitch 10 may comprise the mount 30 being vertically adjustable above or below the relative elevation of the anchor member 26, and thereby the receiver-style hitch to which the anchor member 26 is coupled, without having to remove the hitch 10 from the vehicle.

Embodiments of the adjustable hitch 10 may comprise the hitch ball 80 transitioning and/or moving in a non-linear path, such as, for example, an arcuate path A, as exemplarily depicted in FIG. 5. As a result, not only can the adjustable hitch 10 allow the hitch ball 80 to change elevation, as described above, but it may also allow the hitch ball 80 to change distance from the hitch body 20, and thereby change distance from the receiver-style hitch coupled to the vehicle. For example, in the first position and/or the second position, the hitch ball 80 may be positioned at a first distance D from the hitch body 20. But, as the hitch ball 80 transitions from the first or second positions in an arcuate path to an incremental position between the first and second positions, the hitch ball 80 may be positioned at a second distance D', that is greater than the first distance D. The distances D and D' may be horizontal distances that are substantially parallel with the length L of the anchor member 26. The hitch ball 80 may move and transition in accordance with the mount 30.

In addition to the foregoing distance adjustment, embodiments of the adjustable hitch 10 may comprise the coupling assembly 40 being adjustable for additional distance and elevation. For example, the lengths $C_1$ and $C_2$ of the first coupling 50 and the second coupling 70, respectively, may be adjustable for length. Although not exemplarily depicted, the first and second couplings, 50 and 70, may each be individually adjustable for length by a sliding engagement with component parts. In other words, the first and second couplings, 50 and 70, may be comprised of component complementary parts that may slidably engage one another in a middle region, or at least between opposing ends, to adjust for length. The adjustable lengths, once adjusted to the desired length, may be fastened or otherwise fixed to one another by one or more fasteners 64 to rigidly secure the lengths $C_1$ and $C_2$. In this way, the adjustable hitch 10 may be further customizable for distance D, and not only for distance D, but also for elevation change between the first and second positions or elevation with respect to the hitch body 20. With a greater length, $C_1$ and $C_2$, the mount 30 is positioned further away from the hitch body 20, which allows for greater elevation change between the first and second positions.

The ability of the adjustable hitch 10 to adjust for not only elevation but also distance may provide additional benefits over conventional hitches. For example, the adjustment for elevation may allow a user to utilize the same adjustable hitch 10 to pull trailers of varying heights from the same vehicle or, similarly, to tow the same trailer from different vehicles of varying heights. The adjustable hitch 10 may allow a user to adjust for height discrepancies between the hitch ball and the trailer coupler, such that the hitch ball 80 and the corresponding trailer coupler may match elevations, or at least be proximate in elevation, to ensure a safe and efficient towing of the trailer on the hitch 10. In addition, the adjustment for horizontal distance, due to the distance change between D and D', for example, may allow a user to establish a little more distance between the vehicle body and the trailer body to provide a better turn radius between the vehicle and the trailer. In particular, increasing the distance between the vehicle and the trailer may provide a better turn radius for the vehicle with the trailer attached thereto. The greater the distance, the greater the turn radius and the easier it may be to turn the trailer or even back the trailer into a tight spot, because the trailer can achieve a greater turn angle with respect to the vehicle.

Embodiments of the adjustable hitch 10 may comprise a positioner member 56 that functions to secure the adjustable hitch 10 in any of its varied configurations. To secure the coupling assembly 40 to the hitch body 20 in the first position, second position, or any of the incremental positions therebetween, one or both of the first coupling 50 and the second coupling 70 may have a positioner member 56 coupled thereto to interact and engage the hitch body 20. The positioner member 56 may be integral to either or both of the first coupling 50 and the second coupling 70 or may alternatively be a separate component coupled thereto. As depicted, a positioner member 56 may be integral with the first coupling 50, such that the first coupling 50 functions as the first coupling and the positioner 56. The positioner 56 may have one or more holes 58 therein. The holes 58 may be a series of holes 58 set at incremental positions in the positioner 56. The holes 58 may be configured to run entirely through a width of the first coupling 50 so that the holes 58 are bores. The number of holes 58 may be increased or decreased depending on the number of incremental stops that are desired between the first and second positions.

The holes 58 may be configured to correspond to and communicate with a bore 23 in the hitch body 20. The bore 23 may be positioned in the hitch body 20 between the first and second ends, 22 and 24, thereof. Further, the bore 23 may be positioned in the hitch body 20 at a midpoint between the first and second ends, 22 and 24. Further still, the bore 23 may be positioned at a midpoint between the pivot points where the first coupling 50 and second coupling 70, respectively, are pivotably coupled to the hitch body 20. The bore 23 may be centered with the holes 58, such that as the positioner 56 transitions or moves, the holes 58 pass over the bore 23. In other words, the center of the bore 23 may be aligned with the center of each of the holes 58. In this way, a locking mechanism 60 may be inserted through any one of the holes 58 and through the bore 23 to securely fasten the positioner 56, and thereby the first coupling 50, to the hitch body 20. The first coupling 50 is thereby fixed in place with respect to the hitch body 20, such that the mount 30 and the hitch ball 80 are secured in their respective positions with respect to the hitch body 20. If the elevation or distance of the hitch ball 80 needs to be adjusted, the mechanism 60 may be removed and the positioner 56 can be adjusted, such that a new hole 58 of the series of holes 58 aligns with the bore 23. The locking mechanism 60 can be reinserted to lock the positioner 56 in the newly adjusted position, as determined by the user.

Embodiments of the adjustable hitch 10 may be advantageous over conventional hitches not only with the adjustable vertical elevation and horizontal distance, but additionally with regard to safety. For example, the adjustable hitch 10 may be configured to maintain engagement between the vehicle and the trailer even if the locking mechanism 60 and/or the positioner 56 fail(s) to maintain the coupling assembly 40 in the desired position (i.e., vertical and/or horizontal) with respect to the hitch body 20, the coupling assembly 40 may nevertheless maintain functional engagement between the vehicle, the hitch 10, and the trailer. In other words, under the condition the locking mechanism 60 and/or the positioner 56 fail(s) to function, the coupling assembly 40 may maintain the coupling between the hitch body 20 and the mount 30 and simply transition the mount 30 to the lower-most, base position, or first position and maintain functional and physical engagement between the hitch ball 80 and the trailer coupler attached thereto. As such, although the elevation may change between the vehicle and the trailer, due to the failing of the locking mechanism 60 and/or the positioner 54 to cause the subsequent adjustment of the coupling assembly 40 to the first position, the trailer nevertheless remains behind and attached to the vehicle, by way of the adjustable hitch 10. The failing, disengagement, of malfunction of the adjustment means (i.e., the positioner 56 and/or the locking mechanism 60) does not result in the adjustable hitch 10 failing to keep the trailer coupled to the vehicle.

Figure 3:
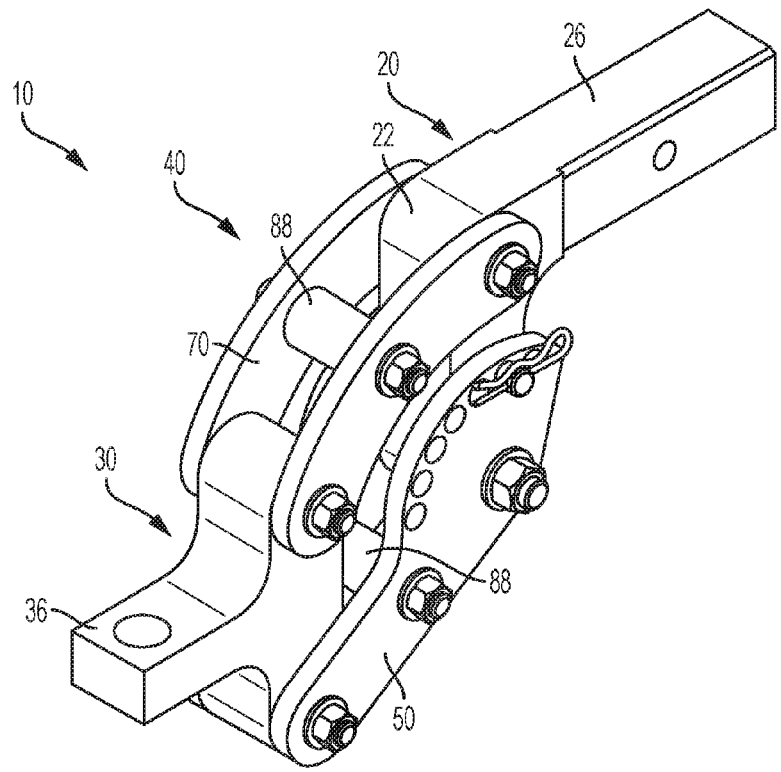
FIG. 3 is a side perspective view of the illustrative embodiment of the adjustable hitch depicted in FIG. 1 in accordance with the present disclosure.
Figure 4:
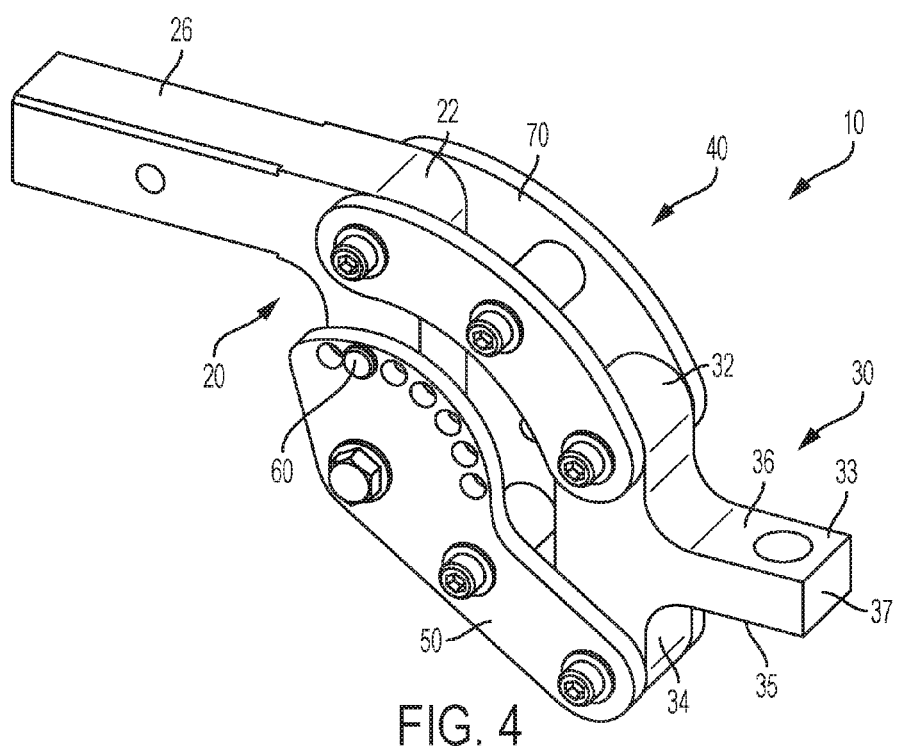
FIG. 4 is a side perspective view of the illustrative embodiment of the adjustable hitch depicted in FIG. 1 in accordance with the present disclosure.

With reference again to FIGS. 3 and 4, embodiments of the adjustable hitch 10 may comprise the coupling assembly 40 having a pair of first couplings 50 pivotably coupled between the hitch body 20 and the mount 30. For example, the coupling assembly 40 may comprise one first coupling 50 coupled to a side of the hitch body 20 and the mount 30 and another first coupling 50 coupled to an opposing side of the hitch body 20 and the mount 30, as depicted in FIGS. 3 and 4. Providing a pair of first couplings 50 on opposing sides of the adjustable hitch 10 may provide for greater strength and rigidity to the adjustable hitch 10. Similarly, embodiments of the adjustable hitch 10 may comprise the coupling assembly 40 having a pair of second couplings 70 pivotably coupled between the hitch body 20 and the mount 30. For example, the coupling assembly 40 may comprise one second coupling 70 coupled to a side of the hitch body 20 and the mount 30 and another second coupling 70 coupled to an opposing side of the hitch body 20 and the mount 30, as depicted in FIGS. 3 and 4. Providing a pair of second couplings 70 on opposing sides of the adjustable hitch 10 may provide for greater strength and rigidity to the adjustable hitch 10. In addition, embodiments of the adjustable hitch 10 may comprise the coupling assembly 40 having a pair of positioners 56. Having a pair of corresponding positioners 56 on opposing sides of the adjustable hitch 10 may provide added strength and security to the particular position of the adjustable hitch 10. For example, with a pair of corresponding positioners 56 on opposing sides of the adjustable hitch 10, the locking mechanism 60 may engage both positioners to provide rigidity and security to the particular position of the adjustable hitch 10. A pin 62 may communicate with the locking mechanism 60 to ensure the locking mechanism 60 does not disengage from the positioners 56.

Embodiments of the adjustable hitch 10 may comprise a spacer 88 to engage the pair of first couplings 50 or the pair of second couplings 70. The spacer 88 may be configured to be placed in between the pair of first couplings 50 or in between the pair of second couplings 70 to securely join the one first coupling 50 to the another first coupling 50 or the one second coupling 70 to the another second coupling 70. For example, a fastener 64 may be engaged with the spacer 88 to secure the pair of first couplings 50 or second couplings 70 together. The spacer 88 may be inserted between the pair of first couplings 50 or second couplings 70 and then the fastener 64, such as a threaded bolt, may be inserted, threaded, or otherwise introduced through one of the first couplings 50 or the second couplings 70 and into the spacer 88. The fastener 64 may then protrude out of the spacer 88 and through the opposing first coupling 50 or second coupling 70. Thereby, a threaded nut may be threaded onto the fastener 64 to fasten or otherwise tighten on the fastener 64 to secure the spacer 88 between the pair of first couplings 50 by friction fit. The spacer 88 may be a substantially rigid member, capable of withstanding pressures and stresses exerted thereon without elastic deformation. The spacer 88 may be comprised, for example, of metals, steels, aluminums, metal alloys, or combinations thereof, or the like that are capable of enduring the forces and pressures exerted during the towing of trailers and the like behind vehicles.

Embodiments of the adjustable hitch 10 may comprise the hitch 10 being structurally and physically configured, according to the description herein, to realize a tow rating of over 12,500 lbs. gross weight towing capacity. Embodiments of the hitch 10 structurally and physically configured, according to the description herein, to realize a tow rating of over 14,000 lbs. gross weight towing capacity. Embodiments of the hitch 10 may comprise an aluminum hitch having a 2" hitch ball and a tow rating over 12,500 lbs. Embodiments of the hitch 10 may comprise a steel hitch having a 2" hitch ball and a tow rating over 12,500 lbs.

Including the disclosure of the structure and operation of the adjustable hitch 10 set forth above, embodiments of the hitch 10 may comprise a method of operating a hitch and/or a method of coupling a trailer to a vehicle by way of a hitch. The method may comprise providing an adjustable hitch and releasably coupling the adjustable hitch to a vehicle. The method may further comprise adjusting the vertical elevation of the adjustable hitch to correspond to a vertical elevation of the trailer coupler of the trailer. The method may further comprise releasably attaching the trailer coupler to the adjustable hitch and towing the trailer with the vehicle coupled thereto. The method may further comprise adjusting the horizontal distance between the vehicle and the trailer by adjusting the adjustable hitch.

The method may further comprise adjusting the vertical elevation of the adjustable hitch by transitioning the hitch ball in a non-linear path. The method may further comprise adjusting the horizontal distance between the vehicle and the trailer by moving and/or transitioning the hitch ball in a non-linear path. The non-linear path may be an arcuate path. The method may further comprise adjusting both the vertical elevation of the hitch ball and the horizontal distance between the vehicle and the trailer by adjusting and/or transitioning the hitch ball in an arcuate path.

The materials of construction of the hitch 10 and its various component parts, including embodiments of the hitch body 20, the mount 30, and the coupling assembly 40, may be formed of any of many different types of materials or combinations thereof that can readily be formed into shaped objects provided that the components selected are consistent with the intended operation of trailer hitches of the type disclosed herein. For example, and not limited thereto, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining the above-described hitch 10 and its various component parts, including embodiments of the hitch body 20, the mount 30, and the coupling assembly 40, may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. An adjustable hitch comprising:
   a hitch body having an adjustment element;
   a mount; and
   a coupling assembly coupled to the hitch body and the mount, wherein the coupling assembly comprises a first and second coupling member each having a first end rotatably coupled to the hitch body and an opposing second end rotatably coupled to the mount thereby enabling the mount to transition in a non-linear path between a first position and a second position with respect to the hitch body,
   wherein the mount is fixed in the first position when a first portion of the first coupling member is coupled to the hitch body at the adjustment element, and wherein the mount is fixed in the second position when a second portion of the first coupling member is coupled to the hitch body at the adjustment element.

2. The hitch of claim 1, wherein the coupling assembly is pivotably coupled to each of the hitch body and the mount.

3. The hitch of claim 1, wherein the second position is elevated with respect to the first position, and wherein the second position is above the hitch body.

4. The hitch of claim 1, further comprising a hitch ball releasably coupled to the mount.

5. The hitch of claim 1, wherein the adjustment member comprises a bore in the hitch body.

6. The hitch of claim 1, wherein the coupling assembly comprises a positioner that communicates with the hitch body to position the mount at incremental stops between the first position and the second position, inclusive.

7. The hitch of claim 1, wherein a removable locking member is positioned in the bore of the hitch body to fix the coupling assembly with respect to the hitch body.

8. The hitch of claim 1, wherein the hitch body releasably couples to a hitch receiver on a vehicle.

9. An adjustable hitch comprising:
a hitch body having a bore therein;
a mount; and
a coupling assembly coupled between the hitch body and the mount, wherein the coupling assembly comprises at least a first hole and a second hole,
wherein the coupling assembly facilitates movement of the mount between a first position above the hitch body and a second position below the hitch body,
wherein the first hole of the coupling assembly is aligned with the hitch body bore when the mount is in the first position,
wherein the second hole of the coupling assembly is aligned with the hitch body bore when the mount is in the second position, and
wherein the mount moves in a non-linear path between the first and second positions, inclusive.

10. The hitch of claim 9, wherein the coupling assembly is pivotably coupled to each of the hitch body and the mount.

11. The hitch of claim 9, wherein the hitch body releasably couples to a receiver-style hitch of a vehicle.

12. The hitch of claim 9, wherein the mount transitions between the first and second positions without decoupling from the coupling assembly.

13. The hitch of claim 9, further comprising a hitch ball releasably coupled to the mount.

14. The hitch of claim 9, wherein the coupling assembly comprises a positioner that communicates with the hitch body to secure the coupling assembly, and thereby the mount, at a position between the first and second positions, inclusive.

15. The hitch of claim 14, wherein the positioner further comprises incremental stops for positioning the mount at increments between the first and second positions, inclusive, wherein the incremental stops comprise at least the first and second holes of the coupling assembly.

16. An adjustable hitch comprising:
a hitch body having an adjustment element;
a mount;
a coupling assembly pivotably coupled between the hitch body and the mount, wherein the coupling assembly comprises an upper and lower coupling member each having a first end rotatably coupled to the hitch body and an opposing second end rotatably coupled to the mount;
a hitch ball releasably coupled to the mount,
wherein the hitch ball transitions along a non-linear path between first and second positions with the second position being elevated with respect to the first position,
wherein the hitch ball is fixed in the first position when a first portion of the lower coupling member is coupled to the hitch body at the adjustment element, and wherein the hitch ball is fixed in the second position when a second portion of the lower coupling member is coupled to the hitch body at the adjustment element.

17. The hitch of claim 16, wherein the second position has an elevation greater than the hitch body.

18. The hitch of claim 16, wherein the hitch ball when in the second position has a greater horizontal distance from the hitch body than when the hitch ball is in the first position.

19. The hitch of claim 16, wherein the hitch body releasably couples to a hitch receiver on a vehicle.

20. The hitch of claim 16, wherein the adjustment element comprises a bore in the hitch body.

* * * * *